(12) United States Patent
Kaddas

(10) Patent No.: US 12,051,528 B2
(45) Date of Patent: Jul. 30, 2024

(54) ELECTRICAL COMPONENT COVER

(71) Applicant: KADDAS ENTERPRISES INC., Salt Lake City, UT (US)

(72) Inventor: James J. Kaddas, Herriman, UT (US)

(*) Notice: Subject to any disclaimer, the term of this patent is extended or adjusted under 35 U.S.C. 154(b) by 152 days.

(21) Appl. No.: 17/169,428

(22) Filed: Feb. 6, 2021

(65) Prior Publication Data
US 2021/0166838 A1 Jun. 3, 2021

Related U.S. Application Data

(63) Continuation of application No. 16/780,763, filed on Feb. 3, 2020, now Pat. No. 11,087,901.

(60) Provisional application No. 62/801,229, filed on Feb. 5, 2019.

(51) Int. Cl.
| | | |
|---|---|---|
| *H01B 7/29* | (2006.01) | |
| *H01B 7/295* | (2006.01) | |
| *H01B 9/00* | (2006.01) | |
| *H01B 17/00* | (2006.01) | |
| *H02G 1/02* | (2006.01) | |

(52) U.S. Cl.
CPC ............. *H01B 7/295* (2013.01); *H01B 9/006* (2013.01); *H01B 17/00* (2013.01); *H02G 1/02* (2013.01)

(58) Field of Classification Search
CPC .. H02G 3/0418; H02G 3/0468; H02G 3/0487; H02G 7/00; H02G 1/02; H02B 1/06; H01B 17/00; H01B 19/00; H01B 7/17; H01B 7/184; H01B 7/1845; H01H 9/0264; A01M 29/26; B60M 1/04; B29C 51/266
USPC .......... 174/5 R, 102 D, 138 R, 139, 172, 136
See application file for complete search history.

(56) References Cited

U.S. PATENT DOCUMENTS

| | | | |
|---|---|---|---|
| 3,835,238 A | 9/1974 | West | |
| 4,449,010 A * | 5/1984 | Apperson | H02G 7/00 74/608 |
| 5,873,324 A | 2/1999 | Kaddas | |
| 6,129,120 A | 10/2000 | Margot | |
| 6,730,852 B1 | 5/2004 | Puigcerver et al. | |
| 9,702,485 B2 | 7/2017 | Hiller et al. | |
| 2007/0054086 A1 * | 3/2007 | Pagel | C08K 5/0008 428/106 |
| 2014/0041899 A1 | 2/2014 | Inagaki et al. | |
| 2015/0014490 A1 | 1/2015 | Sugimoto et al. | |

* cited by examiner

*Primary Examiner* — Roshn K Varghese
(74) *Attorney, Agent, or Firm* — BATEMAN IP; Randall B. Bateman

(57) ABSTRACT

An electrical component cover includes a central portion, a first end portion and a second end portion and one or more flexible portions between the central portion and the first end portion or second end portion to enable the electrical component cover to flex and thereby facilitate varying geometries in power lines attached to insulators.

21 Claims, 5 Drawing Sheets

ELECTRICAL COMPONENT COVER

BACKGROUND

State of the Art

The present disclosure relates to a protective cover for use with electrical components for protecting wildlife and an electrical system. In particular, the present disclosure relates to a protective cover to prevent accidental short circuits created by wildlife contacting conductors of the electrical system. More particularly, the present disclosure relates to a protective cover which is both fire resistant and can accommodate power lines of varying geometries

Field of Art

In the conveyance of electricity over power lines it is necessary to periodically support the power line and to connect lines for distribution to various locations. Each of these functions typically occurs on a power pole. The power pole is typically made of metal or wood and may include a cross member to which one or more insulator bushings are attached. A power line is attached to the insulator bushing in such a manner that the insulator bushing electrically isolates the power line from the pole. A connector is then used to by-pass the insulator to continue the flow of electricity on the line.

While insulator bushings are effective at preventing the transfer of power from the power line to the power pole, the presence of the power line creates a potential hazard for various forms of wildlife. Birds such as owls, eagles, and other predators often like to perch on the cross member or the top of a power pole because it provides good visibility of potential prey on the ground or even in the air. In many environments, the power pole is the tallest item around and thus provides the bird with a commanding view of the surrounding environment as they search for prey. Unlike a tree, the power pole provides minimal interruption to lines of sight.

While the power pole is convenient for prey spotting, it can also be deadly for the bird. If a bird stretches its wings while attempting to take flight or to simply maintain its balance, the wings can contact two different lines. When this occurs, the bird completes an electrical circuit between the two lines and can be electrocuted immediately. Thus, it is advantageous to avoid contact between a bird and power line while the bird is disposed on the cross member.

While large birds are a major concern, they are not the only cause of damage to electricity systems. Squirrels, raccoons and other climbing animals can also climb power poles and other electrical support structures and inadvertently come into contact with two different conductors, thereby killing the animal and potentially damaging the electrical system and/or causing blackouts. Likewise, while discussed above in the context of utility poles, it will be appreciated that there are a variety of situations in which power lines present a hazard to wildlife, and vice versa, such as at power substations and other locations in which an animal contacting a power line can short circuit the system or serve as a path to ground for the electricity.

While a utility company faces economic loss due to damage to the electrical system caused by the bird or other animal, it may also be subject to liability under various environmental protection laws and/or species preservation laws. Many large raptors and other predatory birds are covered by the Endangered Species Act. If such a bird is killed, a utility company may be subject to civil fines and potentially criminal penalties if the utility company has not taken adequate steps to prevent harm to wildlife. These fines can be as large as $10,000 for a first offense and quickly escalate if it is apparent that the utility company is not taking reasonable precautions to prevent harm to protected wildlife. Thus, it is advantageous to provide improved protection against accidental electrocution of animals.

Furthermore, the electrocuted animal may catch fire and pose a wildfire concern. If the animal falls in vegetation which is prone to catching file, a wildfire may quickly develop, causing considerable damage and potential loss of life. In early 2019, PG&E, California's largest utility company, filed for bankruptcy. The company faced liability claims for 17 major wildfires in 2017 and was under investigation in several 2018 wildfires, including the Camp Fire in which at least 86 people were killed.

To minimize wildlife being electrocuted, it has become common to place a cover over lines which pose a risk. Some lines are disposed at known angles and can therefore be covered with a generally rigid part. Thus, for example, if two lines are disposed in line or 180 degrees from one another, a rigid piece of material may be used to cover the area which poses the risk. In many situations, however, the area involves other geometries. For example, one line may leave a power pole at a 145-degree angle relative to the adjacent line which creates the area of concern. On the next pole a line may leave at an angle of 125 degrees from the other line which creates an area of concern.

To accommodate for the wide variety of geometries involved, many utilities use line covers which are made from silicone or polyethylene flexible materials. While such covers are advantageous in that they are easy to use, silicone materials have a tendency to pick up moisture and can catch fire under some conditions. Polyethylene can also catch on fire. As the material melts, burning drops of polyethylene can fall to the ground, potentially sparking a wildfire.

KADDAS Enterprises of Salt Lake City, Utah is known for producing power line protection products made from fire- and flame-resistant materials which will not support combustion, and which is self-extinguishing. The acrylic/PVC blend used by Kaddas is 72 KV rated and thus is highly desirable for covering concern areas along electrical lines. Kaddas' material, however, is fairly rigid, thus providing concerns when the area of concern involves lines which are not disposed along the substantially same axis.

Thus, there is a need for flexible electrical component cover which is made from flame resistant, generally rigid materials such as acrylic/PVC. Preferably, such connectors are easy to use and may be formed by using a thermoforming process, such as vacuum forming or pressure forming.

SUMMARY OF THE INVENTION

The following summary of the present disclosure is not intended to describe each illustrated embodiment or every possible implementation of the invention, but rather to give illustrative examples of application of principles of the invention. There is no requirement that any implementation of the invention of the invention include any specific aspect discussed below.

In some configurations, the disclosure may comprise a housing formed from the generally rigid material having a first end portion and a second end portion and at least one flexible portion disposed between the first end portion and the second end portion. The flexible portion may be formed from a bellows feature made from the generally rigid material. The bellows feature may allow the first end portion and the second end portion of the elongate housing to flex with respect to one another so that the first end portion and the second end portion are disposable along different planes while the housing is disposed on one or more power lines.

In according with one aspect of the present disclosure, the housing may include a first end portion, a second end portion, and a central portion disposed between the first end portion and the second end portion, with a first bellows feature disposed between the first end portion and the central portion and a second bellows disposed between the central portion and the second end portion. The central portion may be configured to receive and engage an insulator from a power pole, with the first end portion extending off in a first direction and the second end portion extending off in a second direction to cover portions of a power line. The bellows features may enable the first end portion and the second end portion to be disposed in different orientations, either horizontally or vertically, to adapt to the direction in which a particular portion of the power line extends from the insulator.

In accordance with another aspect of the disclosure, the housing may be thermoformed from a single sheet of material. In the process of finishing the housing, the sides of the bellows may be cut off to remove the flange portion of the sheet and partially expose the interior of the bellows feature to increase the flexibility of the bellows feature.

The end portions may include engagement members designed to keep a power line within the cover of the housing and/or to engage and hold other line covers to increase the area of power lines which may be protected.

BRIEF DESCRIPTION OF THE DRAWINGS

Various embodiments of the present disclosure are shown and described in reference to the numbered drawings wherein.

Figure 1:
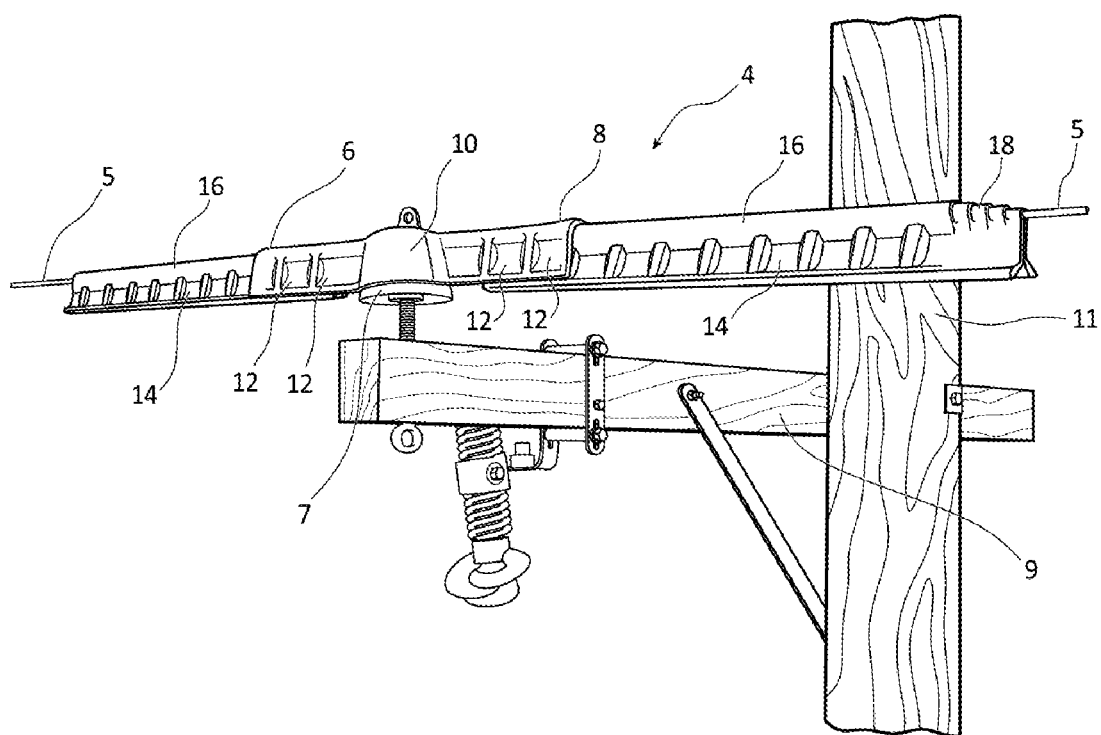
FIG. 1 illustrates a prior art electrical component cover as currently in use.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be at least as vertical as horizontal, i.e. would extend 45 degrees or greater from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, there is shown a perspective view of a prior art electrical component cover, generally indicated at 4. The electrical component cover includes a first end portion 6 and a second end portion 8 which extend from a central portion 10. The central portion 10 is configured to fit over an insulator 7 on a cross member 9 of a power pole 11. The first end portion 6 and the second end portion 8 each have a plurality of engagement members 12 which can both serve to hold the electrical component cover 4 on a power line 5, and which can engage engagement members 14 on a power line protector 16 to extend the length of the power line 5 which is covered to prevent conductive contact with the power line. The power line protector 16 may be provided with a stepped end 18. By cutting the stepped end 18, the person installing the powerline protector can size the end to just slightly larger than the particular power line on which it is installed, thereby providing less movement in harsh weather conditions.

The electrical component cover 4 shown in FIG. 1 is highly desirable because the material from which it made is very durable, and is fire resistant. It has a rating of 72 kV so it can be used on a wide variety of power lines. One drawback with the electrical component cover 4 is that it provides little flexibility. If the power line extends in substantially a straight line over the insulator, then the electrical component cover 4 may be easily attached. However, if the power line changes direction as it passes over the insulator the rigidity of the acrylic/PVC material makes it difficult to use as the ability of the electrical component cover 4 to bend to cover the power line is limited.

Figure 2:
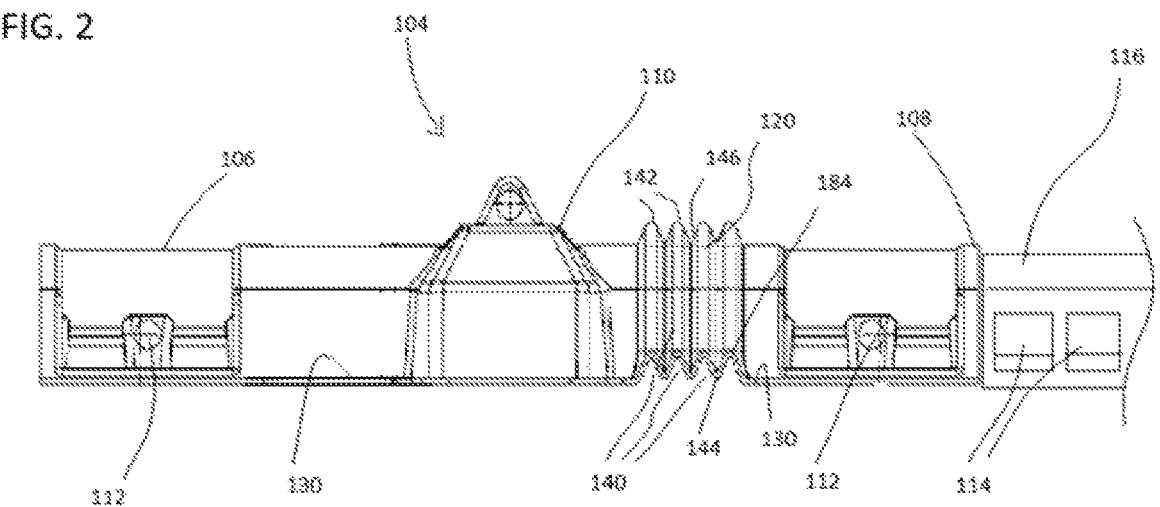
FIG. 2 illustrates a side view of an electrical component cover made in accordance with principles of the present invention.

Turning now to FIG. 2, there is shown an electrical component cover, generally indicated at 104, which may include a first end portion 106, a second end portion 108, and a central portion 110 disposed therebetween. Each of the first end portion 106 and the second end portion 108 may include an engagement member 112 which may be formed by forming a depression into the top/outer side of the material forming the electrical component cover 104. The engagement member 112 may serve one or more purposes. As will be discussed in additional detail with respect to FIG. 5, the engagement member 112 can be used to help hold the electrical component cover 104 onto a power line. The engagement member 112 may also be used to engage a power line protector 116 similar to that shown in FIG. 1, by one or more engagement members 114 thereon to extend the shielded portion of a power line.

Disposed between the central portion and the second end portion is a flexible portion 120. The flexible portion 120 is formed by a bellows-like undulating sidewall portion where the sidewall portion extends outwardly and then extends inwardly and repeats the pattern one or more times. While the face 146 of the sidewall between each crest and each trough could be substantially flat, they may also transition between positive and negative curvatures.

In the embodiment shown in FIG. 2, the electrical component cover 104 may be thermoformed out of a single sheet of material. Forming the sheet of material into the electrical component cover 104 typically leaves a flange 130 which extends around the base of the housing forming the electrical component cover 104. While the flange 130 provides strength to the housing, it can interfere with the functioning the undulating sidewall which forms part of the flexible portion 120. To this end, the sides of the sidewall forming the flexible portion 120 may be trimmed to remove the flange and a portion of the undulating sidewall to leave generally arcuate or triangular recesses 140 at the base 128 of each of the crests. The cut-away portion of the sidewall may be, for example, anywhere from 2-25% of the height of the flexible portion of the sidewall, and in some configurations may be about 5 to 15%, and in other configurations may be about 10%.

In accordance with one aspect of the invention, the trimming can be done such that the sidewall is trimmed inwardly extending to the bottom of the housing by between 1 and 10 degrees and preferably between about 2 and 5 degrees. This may leave the bottom end of each trough cut off above the level of the flange 130. So trimmed, the sidewall portion which forms the flexible portion 120 is able to bend to either side and to bend both upwardly and downwardly. This allows the electrical component cover 104 to adapt to a wide variety of installation scenarios. If the power line engages the insulator and extends in a straight line, then the electrical component cover 104 can be attached in the same manner as the component cover 4 shown in FIG. 1 in FIG. 2. If, however, the power line engages insulator and then extends off at another angle than coaxially or substantial parallel to the other wire, as commonly happens, the flexible portion 120 of the electrical component cover 104 can be positioned so that the power line on one side of the insulator is disposed in the first end portion 106, while the flexible portion 120 can be bent so that the second end portion 108 fits properly on the power line, even though it extends off at an angle other than 180 degrees.

The number of segments in the flexible portion 120 is desirably between 1 and 8 and in the embodiment shown may be between 3 and 5. This allows for sufficient flexibility without requiring excessive amounts of additional material, or thinning the material too much that it becomes susceptible to cracking, etc.

Figure 3:
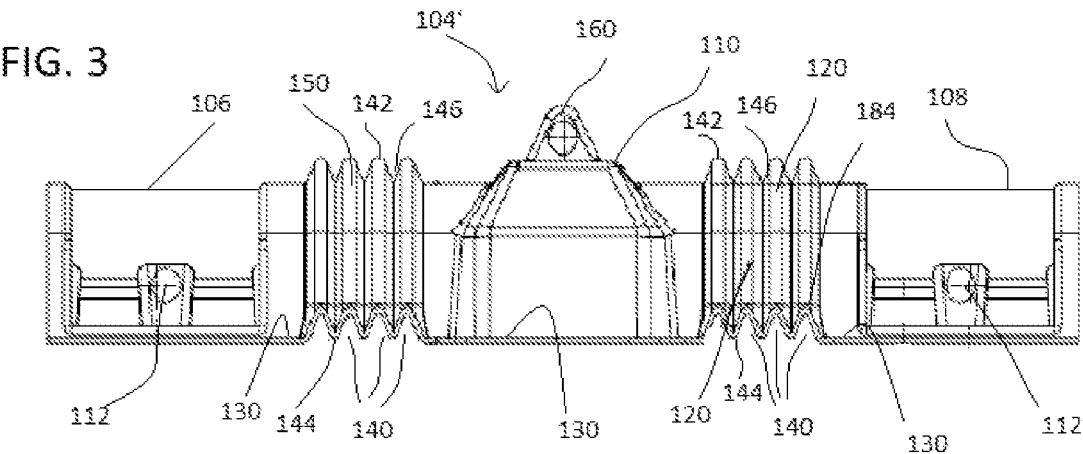
FIG. 3 illustrates a side view of an electrical component cover made in accordance with principles of the present invention.

Turning now to FIG. 3, there is shown a side view of an electrical component cover 104' which is similar to the electrical component cover 104 of FIG. 2, in that it includes a first flexible portion 120 disposed between the second end portion 108 and the central portion 110. The electrical component cover 104' also includes a second flexible portion 150 disposed between the first end portion 106 and the central portion 110. The second flexible end portion 150 includes an undulating sidewall which is trimmed at the bottom to remove the flange 130, and which may cut the portion of the sidewall forming the troughs 144 short so they end above the level of the flange, and expose arcuate or triangular recesses 140 extending upwardly into the sidewall. This enables the electrical component cover 104' to flex on both sides of the central portion 110. This is important as the acrylic/PVC material which may be used to make the covers has a Tensile Modulus of about 310,000 psi (ASTM D-638) and a Flexural Strength of about 9,100 psi (ASTM D-790).

Also shown in FIG. 3 is a handle 160 which is disposed on the central portion 110. The handle 160 facilitates grabbing of the electrical component cover with a hot stick, or some other grasping device. A hot stick is an insulating pole which allows electrical line workers to grasp components attached to an electrical line while keeping the worker insulated from the electricity carried by the power lines.

Figure 4:
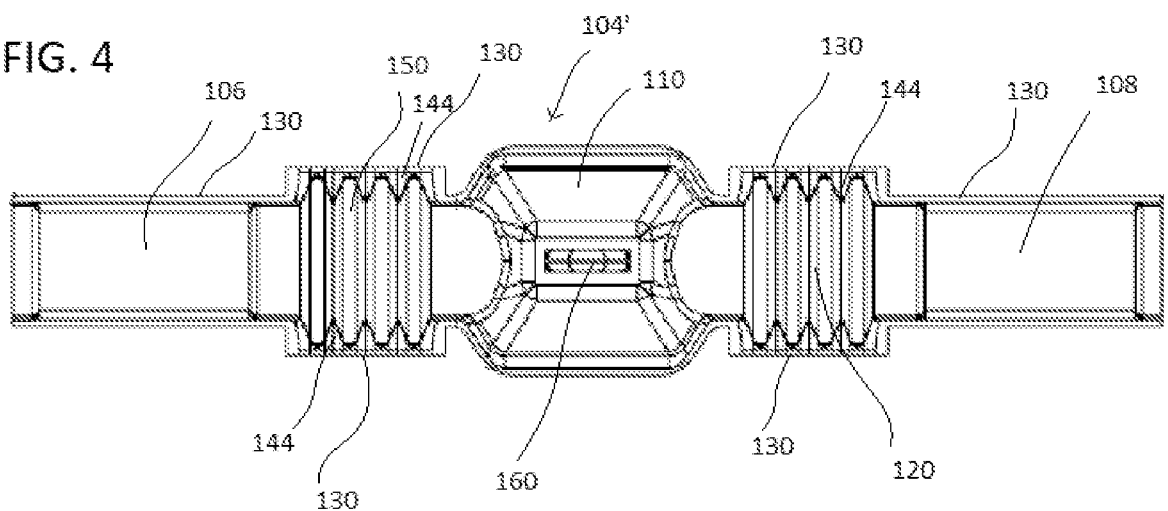
FIG. 4 illustrates a top view of an electrical component cover of FIG. 3.

FIG. 4 illustrates a top view of an electrical component cover of FIG. 3, prior to the sidewall of the flexible portions 120 and 150 being trimmed. The flange 130 is left during the thermoforming process and is typically trimmed off once the housing has cooled. It will be appreciated that the electrical component cover 104' could be made by other forming techniques, such as injection molding, but thermoforming is believed to be more efficient, particularly with generally rigid materials such as acrylic/PVC. A single sheet of the acrylic/PVC material can be inserted into the thermoforming machine. Once released the housing may be allowed to cool for a short period and then the sidewalls along the flexible portions 120 can be trimmed by hand or with a machine by use of a laser, saw or some other blade.

Figure 5:
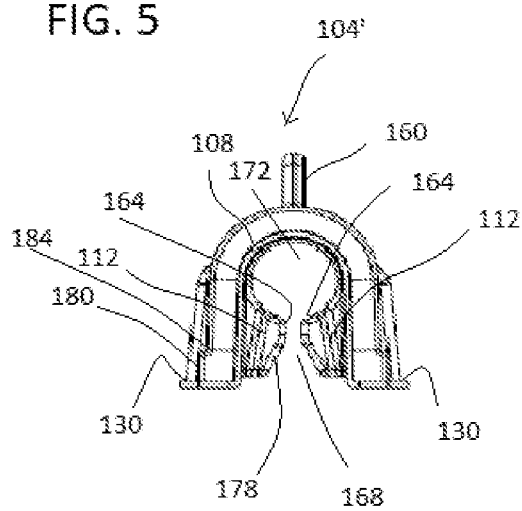
FIG. 5 illustrates an end view of the electrical component cover of FIG. 3.

FIG. 5 illustrates an end view of the electrical component cover of FIG. 3. As part of the thermoforming process, an engagement member 112 may formed into the sidewall which forms part of the first end portion 106 and an engagement member (not shown) may also be formed in to the sidewall which forms part of the second end portion (not shown). The engagement member 112 forms one or more projections which extend into the void 168 between the sidewalls. The projections may include a lip 164 and define a cylindrical area 172 which can either hold a power line, or which may hold a cylindrical portion of a power line protector 16 (such as is shown in FIG. 1). The lip 164 helps to engage the engagement members 14 in the power line protector 16 so that the power line protector is securely grasped by the electrical component cover 104'. The projections may also include a sloped face 178 leading to the lip 164 to facilitate entry of the power line protector, while the lip engages the power line protector to prevent it from being accidentally removed from the electrical component cover 104'.

Also shown in FIG. 5 is a cut end 180 of the peak in the undulating wall which forms the second flexible portion. The peak extends outward along the bottom 5-20 percent of the wall for a fraction of an inch before it is cut off, creating a small flange 184 along each peak portion of triangular shaped recesses of the sidewall defining the flexible portions. (The flanges 184 may effectively disappear along the trough portion depending on the inward angle of the cut.) The flanges 184 provides support to the sidewall while providing minimal interference to the ability of the undulating sidewall to flex either side to side or up and down.

Figure 6:
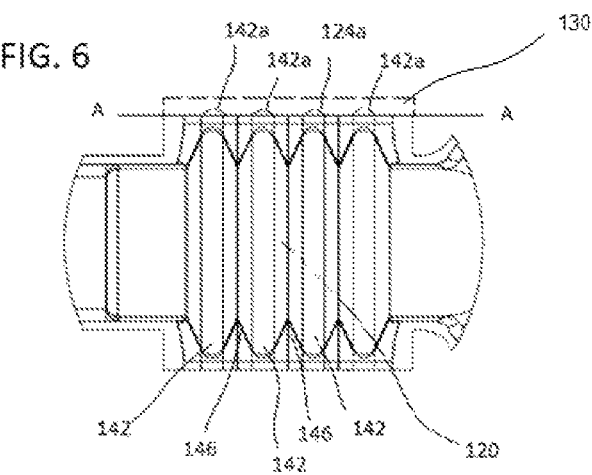
FIG. 6 shows a close-up top view of the bellows feature adjacent the first end portion of FIG. 3.

Turning now to FIG. 6, there is shown a close-up top view of the bellows feature adjacent the first end portion of FIG. 3. As mentioned previously, the housing which formed the electrical component cover 104' typically includes a flange 130 after it is formed. To facilitate the flexibility of the first flexible portion 120 and the second flexible portion (FIGS. 3 and 4) the flange 130 and a lower portion 188 of the peaks is trimmed off along the flexible portions as represented by line A-A. In forming the undulating wall that formed the flexible portions 120 and 150, the peaks 142 may flare outwardly 142a (FIG. 6) shortly before the bottom (see FIG. 5 at 180, 184). The flexible portions 120 and 150 may be cut slightly inwardly as the cut extends toward the bottom of the sidewall and a short distance (typically a quarter of an inch or less) after the peak 142 starts to flare outwardly. This leaves the flange 184, best seen in FIG. 7 at 190 which tracks the top of the triangular recesses, providing support without interfering with the ability of the flexible portions 120, 150 to flex side to side or up and down.

Figure 7:
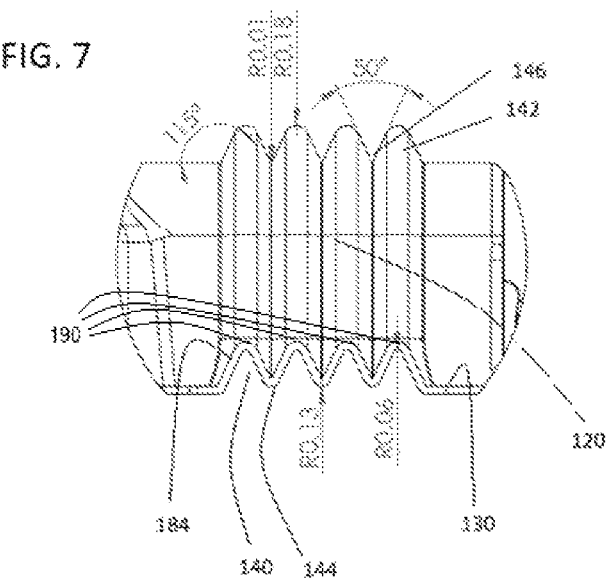
FIG. 7 shows a close-up, side view of the bellows feature adjacent the second end portion of FIG. 3.

FIG. 7 shows a close-up, side view of the bellows-like undulating sidewall of the flexible portions 120 or 150. The peaks extend upwardly so that the sides thereof are typically between about 95 to 145 degrees and most in some embodiments y approximately 115 degrees from the top of first end portion or second end portion. The angles between the bellows or peaks may be, for example, 40-60 degrees, with 50 degrees being used in some embodiments.

The recesses 144 at the bottom of the flexible portion help facilitate bending and in particular bending up or down, while the flange 184 provides support and reduces the risk of tearing along the flexible portions 120, 150. In use the electrical component cover 104' is able to adapt to a wide variety of powerline configurations and provides a durable, flame resistant cover to protect wildlife and prevent wildfires.

Figure 8:
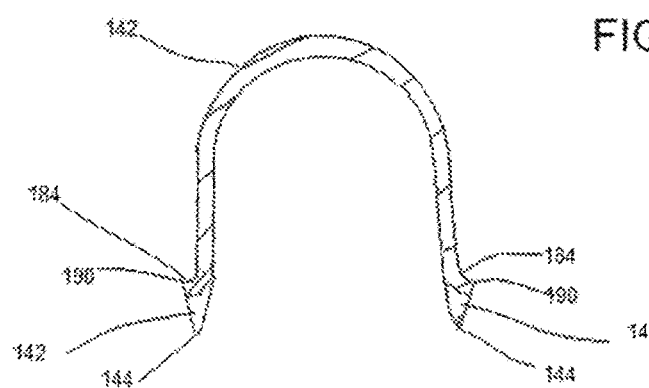
FIG. 8 shows a cross-sectional view taken through a peak of the bellows feature.

FIG. 8 shows a cross-sectional view of the flexible portion 120 taken along one of the peaks 142. The cutting off the flange 130 (FIG. 5) and a portion of the peak leaves the small flange 184 with a peak 190 at the top of the triangular recess 142, while the ends of the trough 144 are recessed slightly above the level where the flange 130 was cut off. (FIG. 6).

Thus, there is disclosed an electrical component cover and methods for making the same. It will be appreciated that numerous modifications may be made without departing from the scope and spirit of this disclosure. The appended claims are intended to cover such modifications.

What is claimed is:

1. An electrical component cover comprising a single piece of material having a first end portion, a second end portion and a rigid central portion defining a void extending the length thereof, the rigid central portion being sized and shaped to cover an insulator on a power line, and least one flexible portion disposed between the rigid central portion and at least one of the first end portion and the second end portion, the electrical component cover being made from a single piece of material, and wherein the electrical component cover is formed from an acrylic/PVC blend.

2. The electrical component cover of claim 1, wherein the at least one flexible portion comprises a flexible portion having an undulating wall.

3. The electrical component cover of claim 1, wherein the first end portion, the second end portion and the rigid central portion are formed by a housing wall having a first bottom end and a second bottom end which are spaced apart from one another along a length of the electrical component cover so as to leave an elongate opening for accessing the void.

4. The electrical component cover of claim 3, wherein the at least one flexible portion comprises a flexible portion having an undulating wall and a plurality of recesses formed along a bottom portion of the undulating wall.

5. The electrical component cover of claim 4, wherein one or more of the plurality of recesses are generally triangular in shape.

6. The electrical component cover of claim 4, further comprising at least one flange extending along the flexible portion so as to define an upper portion of at least one of the plurality of recesses.

7. The electrical component cover of claim 6, wherein recesses of the plurality of recesses are generally triangular in shape and form a plurality of peaks, and wherein the undulating wall has faces between the plurality of peaks which are disposed at an angle of between 40 and 60 degrees.

8. The electrical component cover of claim 7, wherein the undulating wall has faces between the plurality of peaks which are disposed at about 50 degrees.

9. The electrical component cover of claim 1, wherein the at least one flexible portion includes a first flexible portion disposed between the rigid central portion and the second end portion, and a second flexible portion disposed between the rigid central portion and the first end portion.

10. The electrical component cover of claim 1, wherein a first face of the flexible portion is disposed between 95 and 145 degrees from horizontal.

11. An electrical component cover comprising a single piece housing having a first end portion, a second end portion and a central portion disposed therebetween and an open channel extending along a length thereof formed by spaced apart sides of the housing, and a first flexible portion disposed between the central portion and the second end portion and a second flexible portion disposed between the central portion and the first end portion, and wherein the housing is formed from a material rated 72 KV, the central portion being sized and shaped to cover an insulator on a power line.

12. The electrical component cover of claim 11, wherein the electrical component cover is formed from material having a Tensile Modulus of about 310,000 psi (ASTM D-638) and a Flexural Strength of about 9,100 psi (ASTM D-790).

13. The electrical component cover of claim 11, wherein the electrical component cover is formed from an acrylic/PVC blend.

14. The electrical component cover of claim 11, wherein the first flexible portion and the second flexible portion are formed by an undulating sidewall.

15. The electrical component cover of claim 14, wherein the electrical component cover is formed from a single piece of material and wherein the central portion has a bottom surface defining sides of an opening and wherein the flexible portions end above the bottom surface of the central portion.

16. The electrical component cover of claim 15, wherein the bottom surface of the first flexible portion forms a vertically undulating wall.

17. The electrical component cover of claim 16, wherein the undulating wall at the bottom of the first flexible portion has at least one flange which defines an upper portion of one of the generally triangular recesses at the bottom of the flexible portion.

18. The electrical component cover of claim 17, wherein the central portion, the first end portion and the second end portion all include a generally linear flange.

19. An electrical component cover comprising:
a housing having a central portion, a first end portion and a second end portion, a first flexible portion connecting the first end portion to the central portion, the housing being formed by a material extending from a first bottom end to a second bottom end to define a void partially enclosed by the housing, the void extending from an end of the first end portion opposite the second end portion to an end of the second end portion opposite the first end portion and having an opening extending along the central portion, the first end portion, the first flexible portion and the second end portion, the opening being defined by the first bottom end and the second bottom end of the housing being spaced apart from one another; and wherein the central portion has a generally linear flange formed by the material along at least one of the first bottom end and the second bottom end of the housing and the first end portion has a generally linear flange formed by the material along at least one end of the first bottom end and the second bottom end of the housing, and wherein the first flexible portion lacks a generally linear flange along either of the first bottom end and the second bottom end of the housing which form the opening.

20. The electrical component cover of claim 19, wherein the first bottom end and the second bottom end of the housing along the first flexible portion form a vertically undulating bottom end of the housing.

21. The electrical component cover of claim 20, further comprising a plurality of arcuate flanges along the vertically undulating bottom end of the housing.

* * * * *